United States Patent
Fitzpatrick et al.

(10) Patent No.: US 7,512,218 B2
(45) Date of Patent: Mar. 31, 2009

(54) METHOD AND APPARATUS FOR NEGOTIATED MESSAGE DELIVERY

(75) Inventors: Gregory P. Fitzpatrick, Keller, TX (US); David B. Lebowitz, North Richland Hills, TX (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 10/082,774

(22) Filed: Feb. 25, 2002

(65) Prior Publication Data

US 2003/0161451 A1  Aug. 28, 2003

(51) Int. Cl.
H04M 3/42 (2006.01)
(52) U.S. Cl. .............. 379/88.22; 379/211.01; 379/211.02; 379/212.01; 379/213.01; 379/214.01
(58) Field of Classification Search ........... 379/211.01, 379/211.02
See application file for complete search history.

(56) References Cited

U.S. PATENT DOCUMENTS

| 5,436,963 | A * | 7/1995 | Fitzpatrick et al. ..... 379/218.01 |
| 6,263,064 | B1 * | 7/2001 | O'Neal et al. .......... 379/201.03 |
| 6,631,186 | B1 * | 10/2003 | Adams et al. .......... 379/201.12 |
| 6,697,473 | B2 * | 2/2004 | Batten ..................... 379/199 |
| 2002/0061099 | A1 * | 5/2002 | Hayashi et al. ......... 379/211.02 |

* cited by examiner

Primary Examiner—Walter F Briney, III
(74) Attorney, Agent, or Firm—Akerman Senterfitt

(57) ABSTRACT

A method of message delivery can include registering a plurality of reception states for a receiving party. The reception states can specify conditions for establishing communications links with receiving party addresses. A receiving party address can be identified from a first initiated communications link between the sending party and the receiving party. Reception state data specified by the plurality of reception states can be determined according to the receiving party address and can be presented to the sending party.

4 Claims, 3 Drawing Sheets

METHOD AND APPARATUS FOR NEGOTIATED MESSAGE DELIVERY

BACKGROUND OF THE INVENTION

1. Technical Field

The present invention relates to the field of communications systems, and more particularly, to conditionally delivering messages in a communications system.

2. Description of the Related Art

Conventional communications protocols and practice for sending and receiving calls and messages (collectively "messages") allow an intended receiver to be either available and receiving messages, or unavailable and not receiving messages. Common examples of a receiving party being unavailable and/or not receiving messages can include cases where the receiving party screens calls, hides his or her status or presence within an online chat session, or displays a "busy" status indicator in an instant messaging environment. Some communications systems provide an alternate means of communication with an intended receiving party in the event that the first attempt at establishing a communications link fails. For example, a caller may choose to leave a recorded message when the receiving party does not answer a telephone call or choose to page the intended receiving party when that party is not immediately available.

Despite the advances made with regard to communications systems, disadvantages do exist. In the case of on-line chat or instant messaging systems, although a user can display a status message such as "out to lunch" or "on the phone", the status information is limited to the on-line chat environment or the instant messaging environment. Specifically, the posted status of a receiving party within an instant messaging environment would provide no information to a telephone caller attempting to call the receiving party or to any other party attempting to contact the receiving party over a different communications channel, for example via facsimile transmission or electronic mail.

In the case of call forwarding systems, although an incoming call can be routed to one of several different alternative telephone numbers, the calling party is provided with no information as to the location of the receiving party or when the receiving party is likely to access a message or receive a page. Additionally, the calling party is not informed of a more appropriate time to contact the receiving party. Accordingly, repeated and unsuccessful attempts to contact a receiving party can lead to unnecessary network congestion and wasted time on the part of the calling party.

SUMMARY OF THE INVENTION

The invention disclosed herein provides a method and apparatus for facilitating message delivery and conferencing within a communications system. The present invention allows a receiving party to specify a set of rules referred to as reception state data indicating the classification of communication the receiving party would like to receive, the communication channel over which the communication can be received, the times in which selected communications can be received, as well as the particular delivery address to which the communication can be routed. Accordingly, when a sending party initiates a communications link with the receiving party, the sending party can be presented with reception state data corresponding to the receiving party. Using the reception state data, the sending party then can determine whether to proceed with the communication, to try again at a later time, or to try an alternate communication channel and/or delivery address.

One aspect of the present invention can include a method of message delivery. The method can include registering a plurality of reception states for a receiving party, wherein the reception states specify conditions for establishing communications links with receiving party addresses. A receiving party address can be identified from a first initiated communications link between a sending party and the receiving party. Reception state data specified by the plurality of reception states can be determined according to the receiving party address and can be presented to the sending party. A response from the sending party specifying further instructions for processing the first initiated communications link then can be received.

For example, based upon the sending party's response, the first communications link can be completed or terminated. If the first communications link is terminated, according to the sending party's response, a second communications link to a different address of the receiving party using the same communications channel as the first communications link can be initiated. Alternatively, a second communications link using a communications channel different from the communications channel of the first initiated communications link can be initiated.

In one embodiment of the invention, the method can include identifying the sending party address and determining contextually relevant reception state data according to the identified sending party address and the receiving party address. Additionally, contextually relevant reception state data can be determined according to the time of the first communications link and the communications channel over which the first communications link is to be established.

In another embodiment of the invention, which can be used in a multi-party communications environment, the method can include detecting at least one additional initiated communications link from subsequent sending parties, and presenting the reception state data to selected ones of the subsequent sending parties. Alternatively, at least one additional communications link from either the receiving party or the sending party can be initiated to a third party. In that case, reception state data associated with the third party can be presented to the sending party, the receiving party, or both.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and apparatus for facilitating message delivery and conferencing within a communications system. In particular, the present invention allows a receiving party to specify a set of rules referred to as reception state data. The reception state data includes the receiving party's preferences regarding the receipt of messages and communications over various communications channels. When a sending party initiates a communications link with the receiving party, the sending party can be presented with reception state data associated with the receiving party. Using the reception state data, the sending party then can determine whether to proceed with the communication, to try again at a later time, or to try an alternate communication channel or delivery address.

Figure 1:
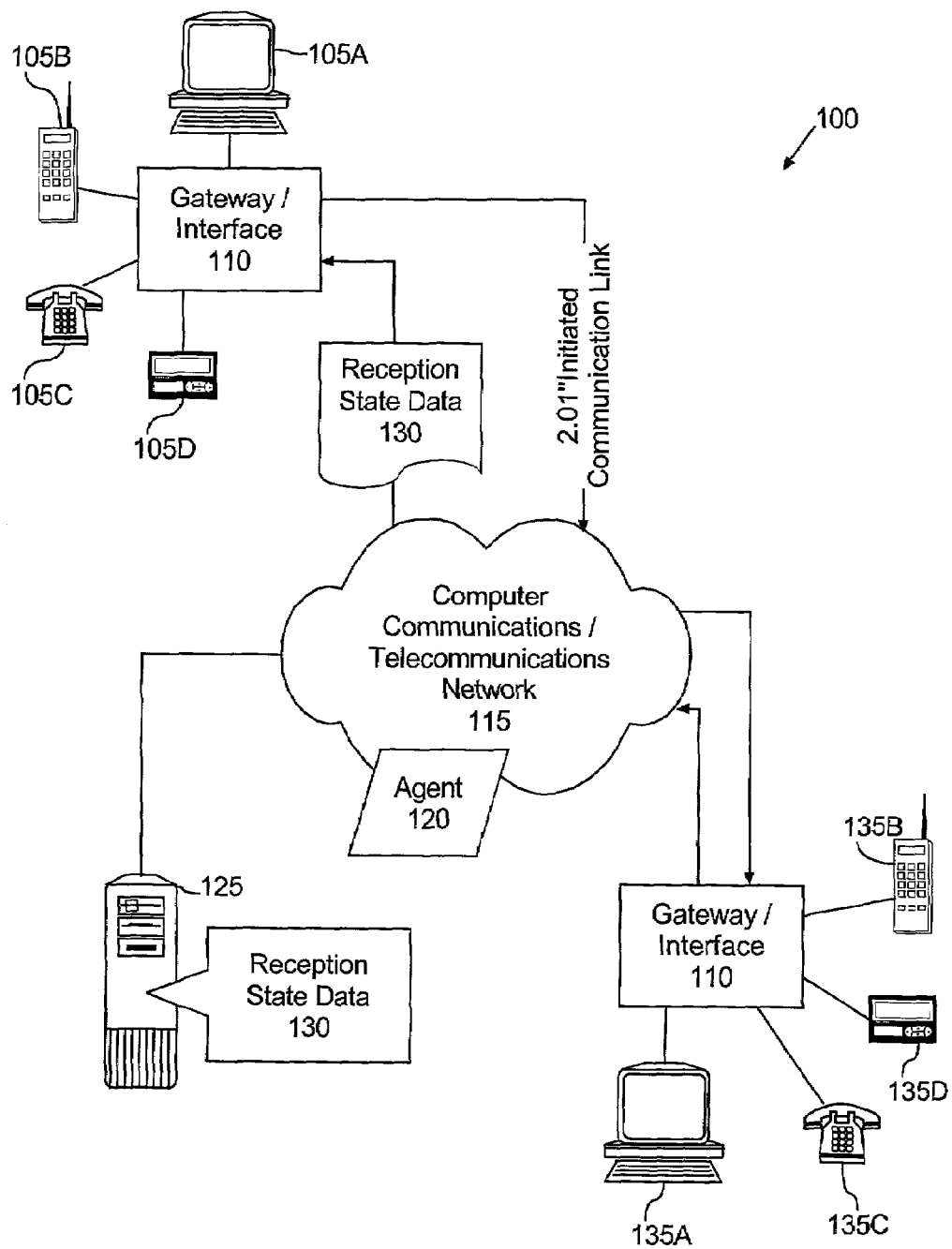
FIG. 1 is a schematic diagram illustrating an exemplary communications system for use with the inventive arrangements disclosed herein.

FIG. 1 is a schematic diagram illustrating an exemplary communications system 100 for use with the inventive arrangements disclosed herein. As shown in FIG. 1, the system 100 can include sending devices 105A-105D, receiving devices 135A-135D, gateway/interfaces 110, a computer communications and/or telecommunications network 115, and a server 125. The sending devices 105 and the receiving devices 135 can include a variety of communications devices capable of communicating over different communications channels. For example, the sending and receiving devices can include computer systems 105A and 135A, wireless telephones 105B and 135B, wired telephones 105C and 135C, pagers 105D and 135D, personal digital assistants (not shown), and the like. As used herein, the term communications channel can include different communications mediums which utilize varying communications protocols such as facsimile transmissions, voice communications over the public switched telephone network (PSTN), voice over IP (VoIP), wireless voice communications, instant messaging, electronic mail, text messaging, paging, and the like.

The gateway/interfaces 110 can include VoIP gateways in the case of VoIP communications, Internet service providers in the case of Internet based communications, or other suitable interfaces depending upon the particular communication channel being used. Accordingly, the computer communications network 115 can include, for example, the Internet, the PSTN, and wireless communications networks. The server 125 can include reception state data 130. The reception state data can specify the classification of communication the receiving party would like to receive, the communication channel over which the communication can be received, the times in which a communication can be received, as well as the particular delivery address to which the communication can be routed.

For instance, the reception state data 130 can be used to categorize different communications into various classes including personal, emergency personal, emergency business, or any other class specified by a receiving party. The classifications can be assigned based upon the identity of the sending party as determined by the sending party's address and the receiving party's classification of those parties as personal or business contacts. The delivery address can vary with the particular communication channel being used. For example, an address can be a telephone number, an electronic mail address, a username as can be used in chat or instant messaging sessions, or any other identifier that can be used to deliver communications over a particular communication channel. Accordingly, a receiving party can have multiple delivery addresses specified within the reception state data 130 for each communication channel specified. Also, the reception state data 130 can specify conditions for establishing communications links with each specified address on a per address basis.

In illustration, reception state data 130 allows a receiving party to specify that a business facsimile transmission from a business contact to one's home facsimile number may be accepted during business hours only, or that business calls to one's work telephone number are to be received only from 9 a.m. to 12 p.m. and from 2 p.m. to 5 p.m. The reception state data 130 further can specify alternate communications channels which a sending party can use to contact a receiving party as well as alternate addresses to which additional communications can be sent whether using the same communications channel or a different communications channel. For example, reception state data 130 can specify that although business calls are not to be received at one's home, electronic mails are allowable. Thus, a business contact calling one's home can choose to initiate a text message if provided an option to do so by the reception state data 130.

Receiving parties can specify reception state data in any of a variety of ways. For example, the receiving party can specify reception state data to the server through a Web-based interface or using a local tool to specify the reception state data and then uploading the data. Alternatively, an agent 120, as is well known in the art for gathering information within computer communication networks, can gather the reception state data 130 from a receiving device such as a computer system and provide the reception state data to the server 125. In one embodiment of the invention, the condition state data can be specified within a receiving party's online calendar.

In operation, a sending party can initiate a communications link to a receiving party using a sending device 105. For example, the sending party can telephone the receiving party or send an electronic mail to the receiving party. The sending device 105 can establish a communications link with the computer communications network 115 through the gateway/interface 110 if necessary. Otherwise, the sending device 105 can be directly connected to the computer communications network 115. Regardless, in the course of establishing the communications link with the receiving party, the sending party address can be identified as well as the receiving party address to which the communication is directed.

Using the identity of the receiving party, the receiving party's associated reception state data 130 can be identified within server 125. For example, in the course of setting up the communications link between the sending party and the receiving party, server 125 can be queried for reception state data corresponding to the receiving party. The reception state data 130 then can be presented to the sending party. For example, if the initiated communications link is a telephone call, the sending party can be presented with a series of voice notifications and possible courses of action. The sending party can select a course of action using a voice or numeric keypad response. In the case of a messaging system, the sending party can be presented with a graphical user interface (GUI) through which to respond and select a particular course of action.

Figure 2:
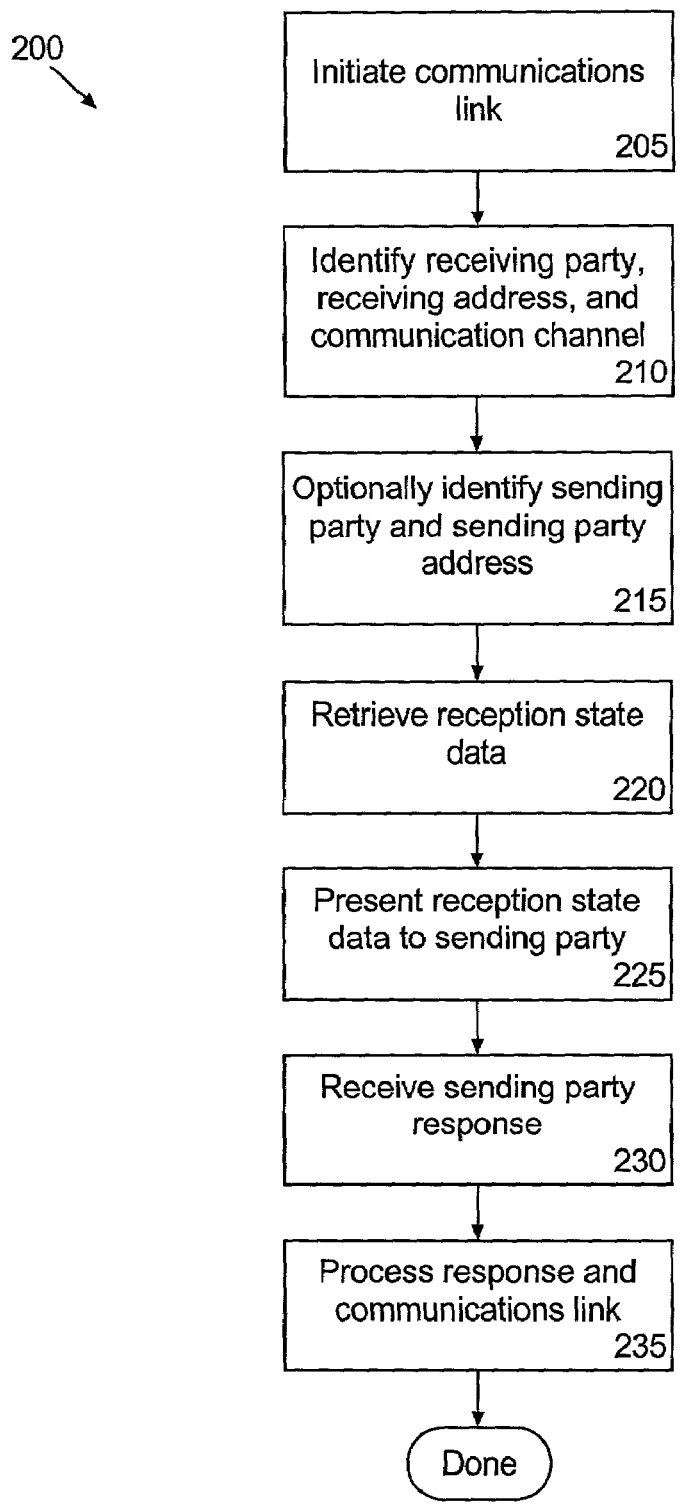
FIG. 2 is a flow chart illustrating a method of message delivery and conferencing for use with the system of FIG. 1.

FIG. 2 is a flow chart illustrating a method of conditional message delivery in accordance with the inventive arrangements disclosed herein. The method can begin in a state wherein a receiving party has established reception state data. As mentioned, the reception state data can be specified by the receiving party using a suitable tool, a Web-enabled GUI, or some other mechanism. Accordingly, the reception state data can be stored within a server communicatively linked to the communications network over which the sending party attempts to contact the receiving party.

Accordingly, as shown in FIG. 2, the method can begin in step 205 where a sending party can initiate a communications link. For example, the sending party can send a message by placing a telephone call or sending a facsimile transmission, an electronic mail, an instant message, or the like. As the initiated communications link proceeds, in step 210, the identity of the receiving party can be determined. The identity of the receiving party can be used to locate the specified reception states of the receiving party in addition to routing the initiated message. Also, the receiving address, for example the telephone number or electronic mail address to which the message is directed, and the particular communication channel, i.e. instant message, facsimile, VoIP, or the like, can be determined.

In step 215, the identity of the sending party and the sending party's address optionally can be determined. The sending party identity and address can be used to classify the initiated communications link, for example as a business call, a personal call, or according to some other category delineated by the receiving party's reception state data. It should be appreciated by those skilled in the art that the sending party's identity and address can be used with the present invention in cases where an incoming communication is to be rerouted automatically based upon the receiving party's reception state data.

In step 220, the reception state data corresponding to the receiving party can be retrieved. Accordingly, in step 225, the reception state data can be presented to the sending party. The manner in which the reception state data can be presented to the sending party can vary according to the particular communication channel of the initiated communication. For example, if the sending party is attempting to call the receiving party, the reception state data can be presented as a series of voice prompts and/or menu selections. Similarly, a return facsimile transmission or electronic mail can be sent to the sending party including at least a portion of the reception state data.

The reception state data can provide sending parties with information as to the status of the receiving party. In particular, the reception state data can notify a sending party that the receiving party will not be available until a designated time, which classes of communications the receiving party is accepting, as well as at which times, and from whom.

In illustration, in cases where a business contact attempts to call a receiving party at home, an interactive voice response unit can provide menu options to the calling party. The menu options can state that the receiving party has chosen not to accept business calls at home and ask whether the calling party would like to leave a message, connect to the calling party despite the receiving party's preference not to receive business calls at home, be transferred to another line, or attempt contacting the receiving party using another communications channel. The options presented to the calling party can be specified by the receiving party in the reception state data.

The reception state data further can be used to restrict which options are presented to callers. For example, a business contact can be given the option of connecting with a receiving party's home telephone prior to 10:00 p.m. despite the receiving party's preference not to receive business calls. This contingency can accommodate for emergency business situations. Still, the receiving party can specify that business contacts only be allowed to leave messages after 10:00 p.m. In that case, a sending party identified as a business contact need not be give the option of completing the initiated communications link with the receiving party.

The portion of reception state data presented to the sending party can vary according to the context of the communication. For example, a business contact calling from an office to the receiving party's office need not be presented with information stating that the receiving party has chosen not to receive business calls at home. Similarly, family members calling a receiving party at home need not be notified that the receiving party prefers not to accept personal calls at work except for emergency cases. Thus, the portions of reception state data presented to sending parties can be determined based upon contextual information concerning the initiated communication such as the time of the communication, the communication channel over which the communication is initiated, the sending and receiving party addresses, and the class of the communication.

In step 230, if the sending party has been queried for a response, the response can be received. For example, in the case of a telephone call, the sending party can select an option such as paging the receiving party, leaving a message, or calling a different number by speaking the option or selecting an appropriate key. It should be appreciated, however, that a response from the sending party may not be required in all situations. For example, a sending party need not respond to a reply facsimile or electronic mail specifying conditions and additional information for contacting the receiving party.

In step 235, the response received from the sending party can be processed. Specifically, depending upon whether the sending party has chosen to connect with the receiving party, to leave a message, to terminate the initiated communications link and initiate a different communications link, whether over a different communications channel or to a different receiving party address, the communications link can be processed accordingly.

The present invention further can be used in multi-party communication environments. For example, the present invention can detect initiated communications links between additional sending parties and the receiving party. Thus, in cases where third party callers initiate a call to a receiving party already engaged in an ongoing telephone call with a sending party, for instance where the third party is to be conferenced into an existing call or interrupts an ongoing call using a call waiting feature, the reception state data associated with the receiving party can be presented to the third party callers. Similarly, a sending party or a receiving party, despite being engaged in an ongoing telephone call, can initiate an outbound call to one or more third parties in an attempt to conference the third parties into the existing telephone call between the sending and receiving parties. In that case, the initiating party, whether the sending party or the receiving party, can be presented with reception state data associated with the third party.

Figure 3:
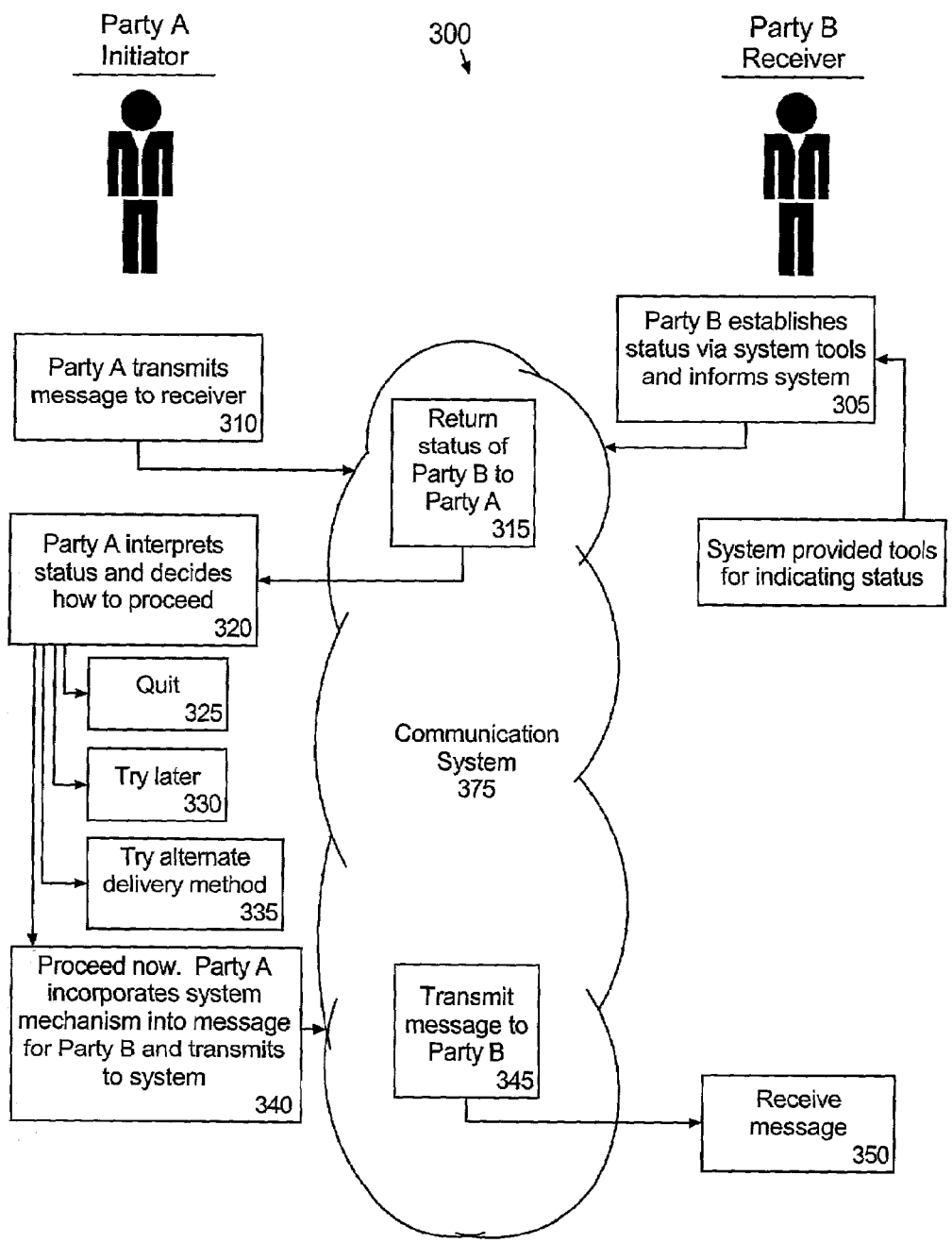
FIG. 3 is a flow diagram illustrating a method of message delivery according to another aspect of the present invention.

FIG. 3 is a flow diagram 300 illustrating another aspect of the present invention. As shown in FIG. 3, in step 305, a receiving party (Party B) can establish status information within the communication system 375. The communications system 375 can be a voice or data processing system within a telecommunications network and/or a computer communications network, for example a gateway, a server, or a telephony switch. Party B can establish the status information using the system provided tools as indicated. In step 310, when the initiating party (Party A) transmits a message to Party B, the communication system 375 can identify Party A's address as well as Party B's address. Thus, the communications system 375 can retrieve Party B's status information, and in step 315, return Party B's status information to Party A.

In step 320, Party A can interpret the received status information and decide how to proceed. For example, Party A can decide to quit as shown in step 325, try sending another message to Party B at a later time as shown in step 330, or try another message delivery method as shown in step 335. Notably, the status information presented to Party A can specify the alternative message delivery method. Still, the status information can indicate that Party B is free to receive messages. In any case, in step 340, Party A can employ a system provided mechanism to indicate to Party B that Party A is proceeding having been informed of Party A's status. For example, Party A can decide to proceed by selecting a system presented option via the keys on Party A's telephony equipment, by providing a voice response, or by selecting an option through a GUI. Regardless, in step 345, Party A's response can cause the message to be transmitted to Party B. In step 350, party B can receive the message.

In one aspect of the invention, rather than transmitting Party A's actual message, the communications system 375 can transmit a notification to Party B. In that case, the notification can specify information relating to Party B's decision regarding how to proceed with the communication. For example, the notification can specify that Party A wishes to contact Party B despite having been notified that Party B does not wish to engage in a particular type of communication. Alternatively, the notification can specify that Party A, who may be classified as a business contact for example, is calling regarding personal matters, and thus, wishes to proceed with contacting Party B. Those skilled in the art, however, will recognize that the notification can include any information from Party A which would inform Party B of Party A's decision to continue transmitting the message. Accordingly, the notification can be transmitted to Party B.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for facilitating message delivery and conferencing within a communications system having multiple communications channels using multiple media types, the method comprising:
    registering with the communications system a plurality of reception states established by a receiving party, wherein each of said reception states specifies reception state data, said reception state data comprising a plurality of rules for establishing a communications link with one or more receiving party addresses, wherein said rules define one or more categories of messages based on a nature of each message, a time at which the receiving party prefers to receive delivery of said messages in each of said categories, a communication channel through which the receiving party prefers to receive delivery of said messages in each of said categories, and a receiving party address associated with said communication channel at which the receiving party prefers to receive delivery of said messages in each of said categories, wherein for at least one of said reception states said defined communication channel is different from a communication channel associated with a first communications link initiated by a sending party, and wherein the nature of each message is determined taking into consideration criteria including a purpose of the message and an identity of the sending party;
    initiating the first communications link by a sending party;
    identifying an identity of the receiving party, an identity of the sending party, a receiving party address, and a sending party address from the first initiated communications link;
    classifying a message from the sending party sent via said first initiated communications link into one of said categories;
    determining and retrieving contextually relevant reception state data from said registered plurality of reception states according to the identity of the receiving party, the identity of the sending party, said receiving party address, said sending party address, the category of the message of the sending party, a time of said first initiated communications link, and the communications channel over which said first initiated communications link is to be established;
    presenting said retrieved contextually relevant reception state data to the sending party via the communication channel associated with the first initiated communications link, wherein said reception state data is presented in a form compatible with a device of the sending party making the first initiated communications link, wherein said reception state data is presented according to a context of the communication;
    interpreting the received reception state data by the sending party;
    instructing the communications system by the sending party to proceed with at least one of the following:
        completing said, first initiated communications link;
        terminating said first initiated communications link;
        initiating a second communications link to a different receiving party address using the same communications channel as said first initiated communication link; and
        initiating a second communications link using a communications channel different from the communications channel of said first initiated communications link; and
    processing said first initiated communications link based on the instructions from the sending party.

2. The method of claim 1, further comprising:
    detecting at least one additional initiated communications link from subsequent sending parties; and
    presenting said reception state data to selected ones of said subsequent sending parties.

3. The method of claim 1, further comprising:
    initiating at least one additional communications link from said receiving party or said sending party to a third party; and
    presenting reception state data associated with said third party to at least one of said sending party or said receiving party.

4. The method of claim 1, further comprising:
    gathering the reception state data from a receiving device using an agent.

* * * * *